Aug. 28, 1956 C. V. ALLEN 2,760,492
STATIONARY TOOTH MOUNTING FOR A ROTARY TYPE THRESHER
Filed May 14, 1953 2 Sheets-Sheet 1

INVENTOR.
CLAUDE V. ALLEN,
BY
Stone, Boyden + Mack
ATTORNEYS.

Aug. 28, 1956　　　　　C. V. ALLEN　　　　　2,760,492
STATIONARY TOOTH MOUNTING FOR A ROTARY TYPE THRESHER
Filed May 14, 1953　　　　　　　　　　　　　2 Sheets-Sheet 2
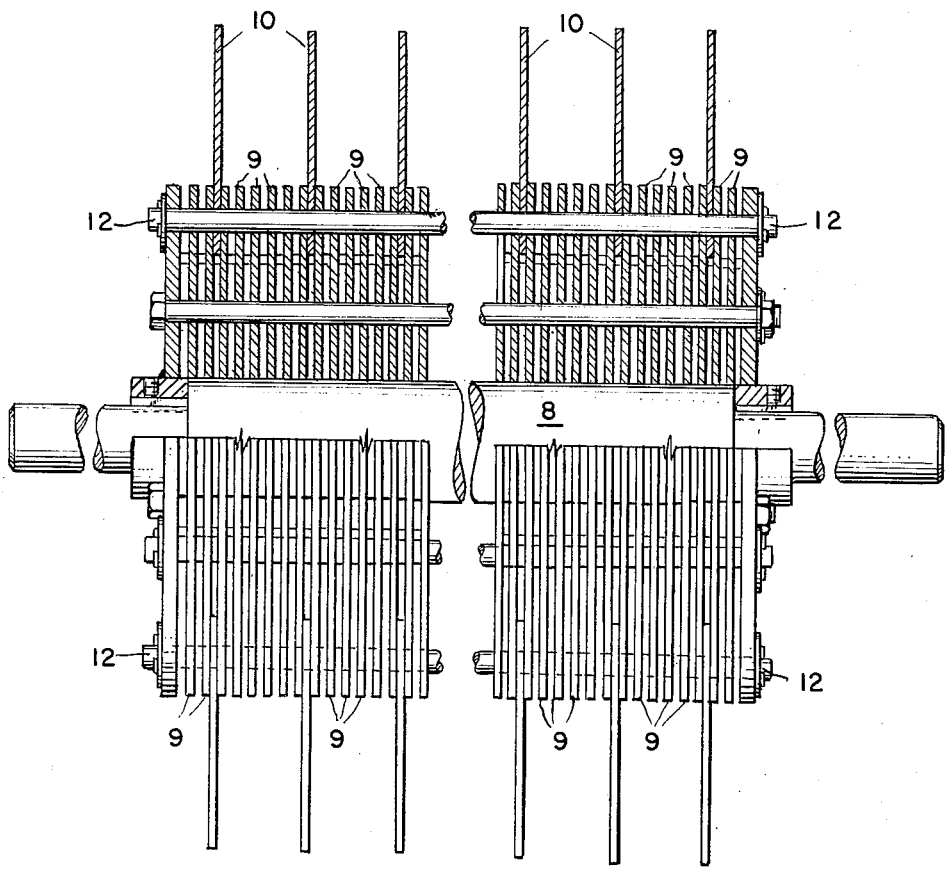
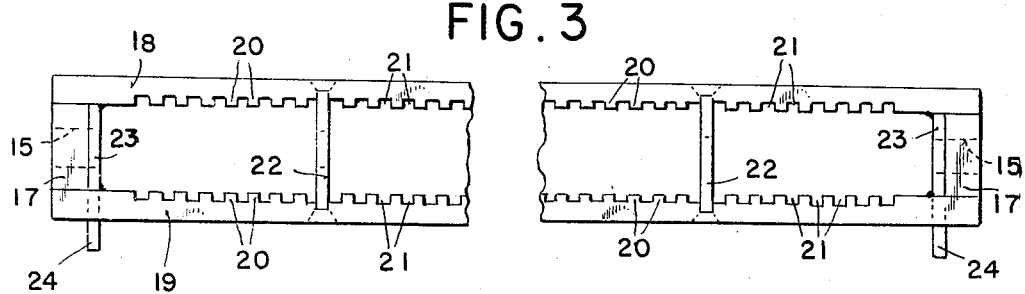
INVENTOR.
CLAUDE V. ALLEN,
BY
*Stone, Boyden & Mack*
ATTORNEYS.

United States Patent Office 2,760,492
Patented Aug. 28, 1956

2,760,492

STATIONARY TOOTH MOUNTING FOR A ROTARY TYPE THRESHER

Claude V. Allen, Richmond, Va., assignor to The Cardwell Machine Company, Inc., Richmond, Va.

Application May 14, 1953, Serial No. 355,143

4 Claims. (Cl. 130—27)

This invention relates in general to threshing machines of the general type having a rotary threshing element with radially extending arms constituting teeth or knives adapted to travel with respect to stationary blades or teeth.

More particularly, the improvement relates to the structure for mounting the stationary teeth. Heretofore, it was the practice to provide a tooth bar in which the teeth were permanently fixed to the bar or support for the teeth. In order to change the tooth spacing, it was necessary to remove the tooth bar in its entirety and replace it with a different bar in which the teeth had the desired spacing. Thus it became necessary to maintain a variety of tooth bars, especially in view of the fact that different products require different spacing of teeth.

In contrast to such prior practice, the desired renewal of worn teeth or the repositioning of teeth may be accomplished with the tooth bar assembly of the present invention by merely removing a common tooth anchor rod, repositioning or renewing the teeth as desired, and replacing the rod so as to lock the teeth in the tooth bar. By this arrangement, any desired spacing may be obtained with a single tooth bar. Also any individual tooth may be replaced when broken or worn, without replacing the complete tooth bar as required in prior practice. Not only does the tooth bar provide for flexibility of arrangement, but this feature combined with a rotor tooth arrangement which may be readily changed, provides for a flexible machine which can be used for a variety of jobs and products.

The foregoing and additional features and advantages of the machine will be described in greater detail in the following specification and claimed in the accompanying claims when considered in connection with the accompanying drawings, in which:

Figure 2 is a side elevation, partly broken away, of the rotor element shown in Figure 1 and illustrating how the rotor blades or teeth are mounted in selected spaces and are held in place by a common locking rod; and Figure 3 is an enlarged front elevation of the multi-slotted tooth bar in which the stationary teeth are adapted to be mounted.

Figure 1:
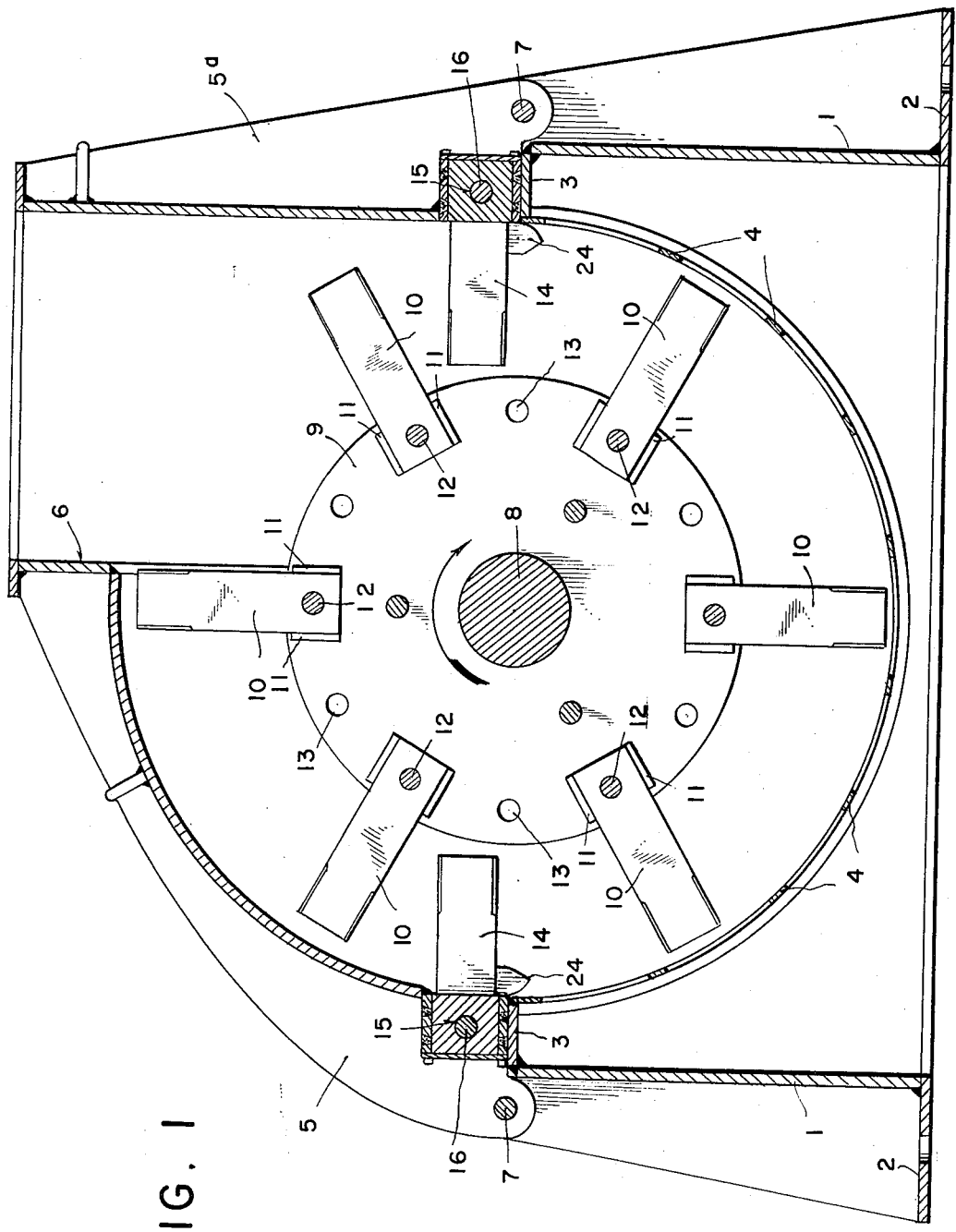
Figure 1 illustrates in vertical section a thresher of the rotary type above mentioned, and which section is taken transversely of the axis of rotation.

Referring in detail to the drawings, 1 indicates the upstanding wall of a base portion and which wall serves as the lower half of the housing for a rotary thresher in which the construction of the present invention is mounted. A laterally extending flange 2 projects from the lower edge of the wall 1 and this flange may be fastened to any suitable supporting base. Between the opposite walls 1 and at the lower edge thereof the structure is open for the discharge of treated or threshed material. At the upper edge of the walls 1, there is a laterally and inwardly extending flange 3 on which may rest the tooth bars of the present invention. One such tooth bar is above each flange 3 and thus the tooth bars are located at opposite sides of the rotor element.

Extending downwardly from the innermost edges of the flanges 3, there is a curved grid 4 with openings therethrough and the curvature of which grid follows the axis of rotation of the rotor member. The grid 4 is only slightly spaced from the outer ends of the teeth of the rotor and the grid serves to retain the material which is being threshed and to prevent it from falling too quickly away from the region of the blade or teeth action.

The upper half of the machine is provide with two doors, one indicated at 5 which constitutes a front door and a second one at 5a on the opposite side of the rotor which may be called a rear door. The material to be treated is introduced through an upper opening having walls 6 leading downwardly and somewhat tangentially toward the rotor.

Referring in detail to the rotor, the main shaft is indicated at 8, and that shaft carries a series of circular plates 9 fixed to the shaft and spaced from each other for the reception therebetween of rotor teeth 10. The teeth 10 are secured against rotation with respect to the plates 9 by parallel flanges 11 in which the sides of the teeth 10 are snugly fitted. The teeth 10 are further snugly locked in place by means of a rod 12 which extends parallel to the axis 8 and through holes 13 in the plates 9 and through corresponding holes in each blade or tooth 10. The bar 12 thus prevents accidental withdrawal of the teeth 10.

The plates 9 are provided with extra openings 13 therethrough whereby additional teeth 10 may be mounted or the teeth which are illustrated moved to different circumferential locations. Suitable fastening rods 12 may be inserted through the extra openings 13.

Referring in detail to the stationary teeth 14, and to the mounting for those teeth, it will be noted that the teeth 14 are provided with holes therethrough indicated at 15 and through which holes a locking rod 16 is introduced.

The multi-slotted tooth bar of this invention is shown in front elevation in Figure 3. It includes two end blocks 17, which are located at opposite ends of slotted walls 18 at the top and 19 at the bottom, and which walls are provided on their adjacent faces with alternate ridges 20 and grooves 21, providing slots into which the teeth 14 may be inserted. After being thus inserted, the locking rod 16 is introduced through the end blocks 17 and the opposite ends of the bar are fixed against accidental withdrawal. At spaced intervals between the upper and lower walls 18 and 19, respectively, of the slotted tooth bar, there are members 22 serving to prevent the walls 18 and 19 from being accidentally forced apart when under strain.

Also shown in Figures 1 and 3, there is illustrated an end plate member 23 which is fixed in position, as by welding, and which is peculiar in that it has a depending tip 24 which projects slightly inwardly toward the axle 8 so that the tip 24 somewhat overlaps the rotary teeth 10. The elements 23 have openings which are in alignment with the opening 15 in the end blocks 17.

Preferably the slotted bar at each side of the machine is securely fixed to the respective doors 5 and 5a so that when those doors are swung back into the open position, the fixed teeth 14 will be swung upwardly and outwardly for ready access and convenient substitution or repositioning of the teeth.

In the foregoing, Figures 1, 2 and 3 are not drawn on the same scale. The rotor shown in Figure 2 is somewhat larger in diameter than the rotor shown in Figure 1, and the slotted knife bar shown in Figure 3 is larger than that shown in Figure 1.

It will be understood that the fixed teeth 14 may be inserted in any of the slots in the knife bar illustrated in Figure 3, depending on the closeness of the blades 10 and the blades 14, and depending also on the nature of the material which is being processed.

The depending tip members 24, as more clearly shown in Figure 1, serve to retain the curved grid member 4 in the position shown in Figure 1; that is, were it not for such members, the curved grid member might have a tendency to become loose and constitute an obstruction to the rotor teeth 10. When either door, 5 or 5ᵃ is opened, the curved grid member 4 is released for removal since the depending tip members 24 are an integral part of the doors.

I claim:

1. In a threshing machine of the type having a rotary threshing element with radially extending teeth adapted to pass, during rotation, stationary teeth, the mounting for stationary teeth comprising a multi-slotted tooth bar having two walls spaced apart and extending parallel to each other and to the axis of rotation of said threshing element, the adjacent faces of said walls being substantially parallel to each other and each adjacent face having a series of notches, the notches of one wall facing the notches of the other wall and opposed notches serving for the reception of the opposite edges of a tooth which bridges the space between opposed notches, teeth in some of said notches, said bar having an end wall at each end spacing said notched walls apart, and means supplementary to said spaced walls for locking said teeth in selected notches.

2. In a threshing machine of the type having a rotary threshing element with radially extending teeth adapted to pass, during rotation, stationary teeth, the mounting for stationary teeth comprising a multi-slotted tooth bar having two walls spaced apart and extending parallel to each other and to the axis of rotation of said threshing element, the adjacent faces of said walls being substantially parallel to each other and each adjacent face having a series of notches, the notches of one wall facing the notches of the other wall and opposed notches serving for the reception of the opposite edges of a tooth which bridges the space between opposed notches, stationary teeth in some of said notches, said bar having an end wall at each end spacing said notched walls apart, and each tooth having an opening therethrough, a rod extending through said openings in said end walls and said teeth for locking said teeth in selected notches.

3. In a threshing machine of the type having a rotary threshing element with radially extending teeth adapted to pass, during rotation, stationary teeth, the mounting for stationary teeth comprising a multi-slotted tooth bar having two walls spaced apart and extending parallel to each other and to the axis of rotation of said threshing element, the adjacent faces of said walls being substantially parallel to each other and each adjacent face having a series of notches, the notches of one wall facing the notches of the other wall and opposed notches serving for the reception of the opposite edges of a tooth which bridges the space between opposed notches, teeth in some of said notches, said bar having an end wall at each end spacing said notched walls apart and rigidly connected to both walls, whereby said notched walls and said end walls constitute a rigid element, and each tooth having an opening therethrough, and a rod extending through said openings in said end walls and said teeth for locking said teeth in selected notches.

4. In a threshing machine of the type having a rotary threshing element with radially extending teeth adapted to pass, during rotation, stationary teeth, the mounting for stationary teeth comprising a multi-slotted tooth bar having two walls spaced apart and extending parallel to each other and to the axis of rotation of said threshing element, the adjacent faces of said walls being substantially parallel to each other and each adjacent face having a series of notches, the notches of one wall facing the notches of the other wall and opposed notches serving for the reception of the opposite edges of a tooth which bridges the space between opposed notches, teeth in some of said notches, said bar having an end wall at each end spacing said notched walls apart and rigidly connected to both walls, whereby said notched walls and said end walls constitute a rigid element, and each tooth having an opening therethrough, and a rod extending through said openings in said end walls and said teeth for locking said teeth in selected notches, and spacing members extending between said notched walls and attached to each, whereby said walls are held against spreading apart intermediate their length.

References Cited in the file of this patent

UNITED STATES PATENTS

| | | |
|---|---|---|
| 418,365 | Bronson | Dec. 31, 1889 |
| 664,851 | Green | Jan. 1, 1901 |
| 889,555 | Stedman | June 2, 1908 |